(12) United States Patent
Tannenberger et al.

(10) Patent No.: US 10,719,118 B2
(45) Date of Patent: Jul. 21, 2020

(54) POWER LEVEL MANAGEMENT IN A DATA STORAGE SYSTEM

(71) Applicant: INTERNATIONAL BUSINESS MACHINES CORPORATION, Armonk, NY (US)

(72) Inventors: Hans-Joachim Tannenberger, Corona de Tucson, AZ (US); Richard Hutzler, Tucson, AZ (US); William K. Morse, Tucson, AZ (US); Bradley Bernhardt, Benson, AZ (US); Mitchell Montanez, Tucson, AZ (US); Karl A. Nielsen, Tucson, AZ (US); Thomas J. Fleischman, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 15/977,400

(22) Filed: May 11, 2018

(65) Prior Publication Data
US 2019/0346904 A1 Nov. 14, 2019

(51) Int. Cl.
*G06F 1/3234* (2019.01)
*G06F 13/40* (2006.01)
(Continued)

(52) U.S. Cl.
CPC .......... *G06F 1/3268* (2013.01); *G06F 1/3234* (2013.01); *G06F 13/14* (2013.01); *G06F 13/40* (2013.01); *G06F 1/20* (2013.01)

(58) Field of Classification Search
CPC .............................. G06F 1/3234; G06F 1/3268
See application file for complete search history.

(56) References Cited

U.S. PATENT DOCUMENTS 6,413,698 B1    7/2002  Tamura et al.
7,443,627 B1 * 10/2008  Krishnamoorthy .. G11B 25/043
                                                    360/69

(Continued)

OTHER PUBLICATIONS

Bisson, et al., "NVCache: Increasing the Effectiveness of Disk Spin-Down Algorithms with Caching," dated 2006,14th IEEE International Symposium on Modeling, Analysis, and Simulation of Computer and Telecommunication Systems, 2006, Mascots 2006, Total 11 pages.

(Continued)

*Primary Examiner* — Glenn A. Auve
(74) *Attorney, Agent, or Firm* — William K. Konrad; Konrad Raynes Davda & Victor

(57) ABSTRACT

In one embodiment, power level management in accordance with the present description, is provided in a storage unit having both a disk storage drive, and another non-volatile, non-disk memory or storage such as a solid state drive, for storing metadata. The metadata storage provides direct access to the metadata stored in the non-disk storage even though the disk storage drive may be in a low power mode in which the data storage media disk of the disk storage drive is stopped or spinning at a reduced rate of rotation. As a result, power consumption and cooling requirements associated with disk storage drives, may be reduced in a low power level mode of storage unit operation for input/output operations limited to metadata stored in the metadata storage. Other features and aspects may be realized, depending upon the particular application.

27 Claims, 8 Drawing Sheets

(51) Int. Cl.
*G06F 13/14* (2006.01)
*G06F 1/20* (2006.01)

(56) References Cited

U.S. PATENT DOCUMENTS

| | | | | |
|---|---|---|---|---|
| 7,472,298 B1* | 12/2008 | Kimmel | ............... | G06F 1/3203 |
| | | | | 713/320 |
| 8,195,878 B2 | 6/2012 | Mittendorff et al. | | |
| 8,630,056 B1 | 1/2014 | Ong | | |
| 8,639,872 B1 | 1/2014 | Boyle et al. | | |
| 8,670,205 B1 | 3/2014 | Malina et al. | | |
| 8,782,334 B1 | 7/2014 | Boyle et al. | | |
| 8,917,471 B1 | 12/2014 | Hasfar et al. | | |
| 9,009,393 B1 | 4/2015 | Sutardja | | |
| 9,170,899 B2 | 10/2015 | Eleftheriou et al. | | |
| 9,176,867 B2 | 11/2015 | Bulkowski et al. | | |
| 9,390,020 B2 | 7/2016 | Jannyavula Venkata | | |
| 9,836,232 B1* | 12/2017 | Vasquez | ............... | G06F 3/0613 |
| 2007/0079086 A1* | 4/2007 | Wang | ............... | G06F 3/0625 |
| | | | | 711/161 |
| 2008/0024899 A1* | 1/2008 | Chu | ............... | G06F 3/0614 |
| | | | | 360/69 |
| 2009/0059414 A1* | 3/2009 | Lee | ............... | G11B 19/00 |
| | | | | 360/75 |
| 2010/0238574 A1* | 9/2010 | Balasubramanian | ............... | |
| | | | | G06F 3/0625 |
| | | | | 360/15 |
| 2011/0246821 A1 | 10/2011 | Eleftheriou et al. | | |
| 2012/0210058 A1 | 8/2012 | Mittendorff et al. | | |
| 2013/0227220 A1* | 8/2013 | Xi | ............... | G06F 12/0891 |
| | | | | 711/133 |
| 2014/0047261 A1* | 2/2014 | Patiejunas | ............... | G06F 1/266 |
| | | | | 713/330 |
| 2014/0052978 A1 | 2/2014 | Sung | | |
| 2017/0060442 A1* | 3/2017 | Dunn | ............... | G06F 3/0608 |
| 2019/0050330 A1* | 2/2019 | Vui | ............... | G06F 3/0647 |

OTHER PUBLICATIONS

Kaiser et al., "Esb: Ext2 Split Block Device," dated 2012, IEEE 18th International Conference on Parallel and Distributed Systems (ICPADS), Total 9 pages.

J. Shaman, "Seagate SSHD Thin Review (Gen3 500GB, ST500LM000)", dated Mar. 8, 2013, (online), retrieved from the Internet at URL>http://www.storagereview.com/seagate_sshd_thin_review_gen3_500gb_st500lm000, Total 10 pages.

"WD External Hard Drive Spins Down After Several Minutes of Inactivity" (online), retrieved from the Internet on Apr. 30, 2018 at URL>https://support.wdc.com/knowledgebase/answer.aspx?ID=1376, Total 1 page.

"HP SmartCache Technology", dated Feb. 2013, Technical White Paper, (online), retrieved from the Internet on Apr. 30, 2018 at URL>https://www.lanclan.nl/wp-content/uploads/2014/06/hp_smart_cache.pdf, Total 12 pages.

* cited by examiner

POWER LEVEL MANAGEMENT IN A DATA STORAGE SYSTEM

BACKGROUND OF THE INVENTION

1. Field of the Invention

The present invention relates to a computer program product, system, and method for power level management in data storage systems.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Accordingly, data from a host to be stored in the data storage system is typically directed to a primary device of a primary data storage system at a local site and then replicated to one or more secondary devices of secondary data storage systems which may be geographically remote systems from the primary data storage system. One primary device can have multiple secondary relationships in which data directed to a primary device is replicated to multiple secondary devices.

A storage controller of such data storage systems may control multiple storage devices that may include hard disk drives, tapes, solid state drives, etc. The storage controller may manage Input/Output (I/O) requests from networked hosts to the plurality of storage devices. The data stored on a storage device typically includes not only user data but also metadata concerning the storage device and its stored data. Examples of metadata include storage device configuration data and data describing the user data, such as a directory of files stored on the storage device. In contrast, user data is data directly related to the operations of the user. For example, in the context of a user such as a bank, user data may include for example data concerning account deposits and withdrawals, loan payments, payroll, etc. A storage controller may issue an input/output request to the storage device to read or write user data, metadata or a combination of both user data and metadata.

Hard disk drives may consume substantial power, particularly in large data farms having a large number of such disk drives. For example, each hard disk drive includes a motor to spin disk media. Not only do such motors consume substantial power, but may also generate significant heat. As a result, additional power is frequently consumed for cooling the hard disk drives as well as for operating the hard drives.

There have been various approaches to reduce power consumption in data storage devices. One known techniques is to slow or stop the spinning disk of a hard disk drive when the hard disk drive is idle. Thus, if no input/output requests are received by a hard disk drive over a predetermined idle period, the hard disk drive may enter a low power mode in which the power to the disk motor may be cut to stop the spinning of the disk. In some low power modes, the power to spin motor is reduced rather than completely cut, which reduces the spin rate of the disk to a relatively low rate of rotation and power consumption. The read/write head of the disk drive may be parked in the low power mode or may be permitted to fly over a particular cylinder or periodically moved to reduce wear on any one cylinder of the disk media.

If a hard disk drive being operated in a low power mode receives an input/output request, the hard disk drive returns to a full power mode which spins the disk media up to the normal operational spin speed and the hard disk drive performs the requested input/output operation. Accordingly, input/output requests are typically not satisfied in a low power mode, particularly if the spinning of the disk media has been stopped or reduced below an operational level.

Hard disk drives and tape drives are typically slower than comparable non-mechanical data storage such as flash memory, solid state drives, battery-backed up dynamic random access memory (RAM), etc. However, such non-mechanical data storage devices frequently have a significantly lower storage capacity as compared to hard disk drives or tape drives of comparable cost. One known approach is to provide a hybrid data storage device having for example, both a high speed, low capacity solid state drive and a slower, high capacity hard disk drive. In one known hybrid storage, the high speed drive is configured to act as a high speed cache for the slower hard disk drive. Thus, read operations directed to the hybrid data storage device are satisfied with data present in the high speed drive if that data has previously been cached in the front end drive. Conversely, if the data needed to satisfy the request is not present in the high speed drive, the requested data is staged from the hard disk drive to the high speed drive to satisfy the read request.

SUMMARY

One general aspect of a computing environment employing power level management in accordance with the present description, is directed to transferring metadata between an input of a storage unit and a metadata storage of the storage unit in a first power level mode in which reading data from and writing data to a data storage media disk of a disk storage drive of the storage unit is disabled. Further, data may be transferred between the storage unit input and the data storage media disk of the disk storage drive in a second power level mode in which reading data from and writing data to the data storage media disk of the disk storage drive is enabled. In one embodiment, the first power level mode has a reduced level of power expenditure as compared to the second power level mode. As a result, computer technology may be improved. For example, power consumption and cooling requirements associated with disk storage drives, may be reduced in a low power level mode of storage unit operation for input/output operations limited to metadata stored exclusively on the metadata storage instead of on the disk storage drive.

In another aspect, the data storage media disk of the disk storage drive may be configured to rotate at a first rate of rotation in the first power level mode and configured to rotate at a second rate of rotation in the second power level mode where the first rate of rotation is less than the second rate of rotation of the data storage media disk and where the first rate of rotation is within a range which includes zero revolutions per minute. By reducing or stopping the rate of rotation of the disk in the first power level mode, power consumption and cooling requirements associated with disk storage drives, may be reduced to a low power level mode of storage unit operation for input/output operations limited to metadata stored on the metadata storage instead of on the disk storage drive. Furthermore, the life of the disk storage drive may be extended by reducing or stopping the rotation of the disk storage media disk in the low power level mode of storage unit operation for input/output operations limited to metadata stored on the metadata storage instead of on the disk storage drive.

Still another aspect is directed to receiving an input/output request directed to a data storage location of the data storage media disk of the disk storage drive in which the storage unit is in the first power level mode and reading data from and writing data to a data storage media disk of the disk storage drive is disabled. In response to the input/output request, a power level mode of the storage unit may be changed from the first power level mode to the second power level mode. The mode change may include increasing a rate of rotation of the data storage media disk from the first rate of rotation of the first power level mode to the second rate of rotation of the second power level mode, and executing the input/output request in the second power level mode following changing the power level mode of the storage unit from the first power level mode to the second power level mode. In executing the input/output request in the second power level mode, at least one of reading data from and writing data to the data storage media disk of the disk storage drive is performed. In this manner, the duration of periods of reduced power consumption and cooling requirements may be extended until an input/output request directed to the disk storage drive is received.

Yet another aspect is directed to, in response to changing the power level mode of the storage unit from the first power level mode to the second power level mode, timing a grace period of disk idle time. A determination may be made as to whether at least one additional input/output request directed to a data storage location of the data storage media disk of the disk storage drive is received within the grace period of disk idle time. Upon expiration of the grace period of disk idle time, if it is determined that no additional input/output request directed to a storage location of the data storage media disk of the disk storage drive is received within the grace period of disk idle time, the power level mode of the storage unit may be changed from the second power level mode back to the first power level mode. Such change of power level mode may include, for example, decreasing the rate of rotation of the data storage media disk from the second rate of rotation of the second power level mode back to the first rate of rotation of the first power level mode. In this manner, the duration of periods of increased power consumption and cooling requirements may be minimized and the duration of periods of reduced power consumption and cooling requirements may be increased. Moreover, the grace period of disk input/output idle time can reduce or eliminate undesirable cycling between low and full power level modes.

Still another aspect is directed to receiving an input/output request directed to the metadata storage of the storage unit in which the storage unit is in the first power level mode and in which reading data from and writing data to a data storage media disk of the disk storage drive is disabled. In response to the input/output request directed to the metadata storage, a power level mode of the storage unit at the first power level mode may be maintained, including maintaining a rate of rotation of the data storage media disk at the first rate of rotation of the first power level mode of the storage unit, and executing the input/output request directed to the metadata storage in the first power level mode of the storage unit. As a result, the duration of periods of increased power consumption and cooling requirements may be minimized and the duration of periods of reduced power consumption and cooling requirements may be increased. Moreover, undesirable cycling between low and full power level modes may be reduced as well.

In another aspect, an input/output request directed to a data storage location of the data storage media disk of the disk storage drive may be directed to data which includes non-metadata. Conversely, an input/output request directed to the metadata storage of the storage unit may in one embodiment be directed to data limited to metadata. Because the quantity of metadata to be stored in a storage unit may be substantially smaller as compared to the quantity of non-metadata to be stored in a storage unit, storing the non-metadata on a data storage media disk and storing the metadata in the metadata storage may facilitate using lower capacity yet faster access storage to implement the metadata storage. Accordingly, implementing the metadata storage as one of non-volatile storage, non-volatile solid state memory, non-volatile flash memory and volatile memory having a backup battery power source, may be facilitated.

Still another aspect is directed to assigning first logical storage addresses of a logical storage address space to physical data storage locations of the metadata storage and assigning second logical storage addresses of the logical storage address space to physical data storage locations of the data storage media disk of the disk storage drive where the second logical storage addresses of the logical storage address space are separate from the first logical storage addresses of the logical storage address space. Such an arrangement facilitates separate access to the metadata storage by an external processor such as a storage controller processor, or by an internal processor such as a storage unit processor. Thus, a metadata input/output request may be received either from a processor external to the storage unit or a processor internal to the storage unit. Metadata may then be transferred between the storage unit input and the metadata storage of the storage unit in the first power level mode, for example, in response to a received metadata input/output request whether from an internal or external processor.

Implementations of the described techniques may include hardware, a method or process, or computer software on a computer-accessible medium. Other features and aspects may be realized, depending upon the particular application.

DETAILED DESCRIPTION

Figure 1:
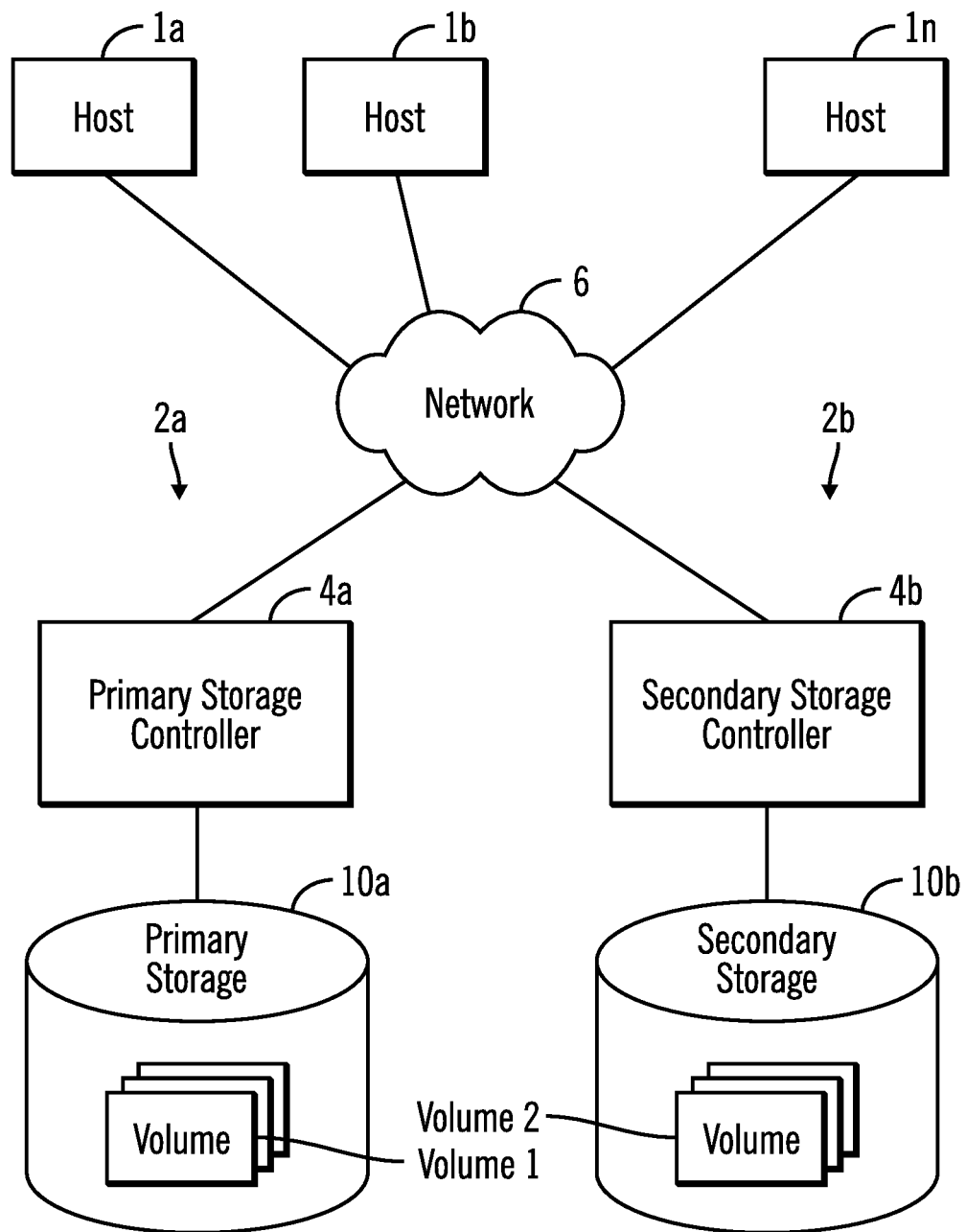
FIG. 1 illustrates an embodiment of a computing environment employing power level management in a data storage system in accordance with one aspect of the present description.

In one aspect of power level management in accordance with the present description, a storage unit has both a disk storage drive, and another non-volatile memory or storage such as a solid state drive, for example, in parallel to the disk storage drive of the storage unit to provide direct access to metadata stored exclusively on the parallel storage even though the data storage media disk of the disk storage drive may be stopped or spinning at a reduced rate of rotation in a low power level mode. In one embodiment, the parallel non-volatile storage referred to herein as the "metadata storage," may be implemented using a non-volatile storage drive lacking a data storage media disk which requires spinning at a high rate of rotation for input/output operations.

Utilizing power level management in accordance with the present description can improve computer technology. For example, power consumption and cooling requirements associated with disk storage drives, may be reduced to a low power level mode of storage unit operation for input/output operations limited to metadata stored exclusively on the metadata storage instead of on the disk storage drive. Furthermore, the life of the disk storage drive may be extended by reducing or stopping the rotation of the disk storage media disk in the low power level mode of storage unit operation for input/output operations limited to metadata stored exclusively on the metadata storage instead of on the disk storage drive. Other improvements to computer technology may be provided by power level management in accordance with the present description, depending upon the particular application.

In one embodiment, a parallel, non-volatile and non-disk storage of the storage unit may be limited to storing exclusively metadata such as metadata related to configuration of the disk storage drive, for example, or metadata related to the user data stored on the data storage media disk, for example, or both. Hence, the parallel, non-volatile and non-disk storage is frequently referred to herein as a "metadata storage" as noted above. Although referenced as a metadata storage, it is appreciated that a metadata storage in accordance with the present description may store data in addition to metadata in some embodiments.

Because the quantity of metadata to be stored in a storage unit may be substantially smaller as compared to the quantity of non-metadata to be stored in a storage unit, storing the non-metadata on a data storage media disk and storing the metadata in the metadata storage may facilitate using lower capacity yet faster access storage to implement the metadata storage. Accordingly, implementing the metadata storage as a non-volatile storage, non-volatile solid state memory, non-volatile flash memory and volatile dynamic random access memory (RAM) having a backup battery power source, for example, or other non-volatile, high speed, non-disk storage, may be facilitated.

The metadata storage may be implemented in, for example, an internal controller of one or more disk storage drives of the storage unit to allow access to the metadata of the associated disk storage drive in the low power level mode notwithstanding that the disk itself is not spinning or is spinning at a reduced rate which may be below the minimum rotational rate required for input/output operations directed to the data storage media disk of the disk storage drive. Conversely, the metadata storage may also provide access to metadata stored in the metadata storage when the associated disk storage drive is in a full power mode in which the data storage media disk of the disk storage drive is spinning at a full operational rate of rotation which may be at or above the minimum rotational rate required for input/output operations directed to the data storage media disk of the disk storage drive.

It is appreciated that the quantity of metadata to be stored in a metadata storage in accordance with the present description may be relatively small compared to the overall capacity of a solid state drive or other non-volatile, non-disk storage used to implement the metadata storage. As a result, if the metadata storage is implemented in a solid state drive, for example, and if the portion of the solid state drive storing the metadata is approaching "burn out" or otherwise approaching end of useful life, the metadata may be transferred to unused portions of the solid state drive extending the useful life of the solid state drive for metadata storage. Similar benefits may be accorded other types of non-volatile, non-disk storage if used to implement a metadata storage in accordance with the present description.

Also, as noted above, the life of the disk storage drive may be extended by reducing or stopping the rotation of the data storage media disk in the low power level mode of storage unit operation for input/output operations limited to metadata stored exclusively on the metadata storage instead of input/output operations directed to storage locations on the data storage media disk of the disk storage drive. Moreover, multiple copies of the metadata may be stored in the metadata storage providing a high degree of redundancy for the stored metadata.

In one aspect of the present description, power level mode logic is configured to selectively change or maintain the power level mode of operation of the storage unit as a function of the storage type to which a received input/output operation is directed, and as a function of the current power level mode of operation of the storage unit. For example, if the storage unit is currently operating in the low power level mode of operation in which the disk is not spinning or is spinning at a reduced rate, and an input/output operation received by the storage unit is directed to data stored on the data storage media disk of the disk storage drive, for example, the power level mode logic is configured to change the power level mode from the low power level mode to the full power level mode, which causes the disk to spin up to the full operational rate of rotation. Following the changing of the power level mode of the storage unit from the low power level mode to the full power level mode, data transfer logic executes the input/output request in the full power level mode by at least one of reading data from and writing data to the spinning data storage media disk of the disk storage drive. In this manner, the duration of periods of reduced power consumption and cooling requirements may be extended until an input/output request directed to the disk storage drive is received.

Conversely, if the storage unit is currently operating in the full power level mode of operation in which the disk is spinning at a full operational rate of rotation when an input/output operation received by the storage unit is directed to data stored on the data storage media disk of the disk storage drive, for example, the power level mode logic is configured to maintain the power level mode at the full power level mode so that the disk continues to spin at the full operational rate of rotation. Here too, data transfer logic executes the input/output request in the full power level mode by at least one of reading data from and writing data to the spinning data storage media disk of the disk storage drive.

As another example, if the storage unit is currently operating in the low power level mode of operation in which the disk is not spinning or is spinning at a reduced rate, and an input/output operation received by the storage unit is directed to data stored in the metadata storage, and thus excludes non-metadata such as user data stored on the data storage media disk of the disk storage drive, for example, the power level mode logic is configured to maintain the power level mode at the low power level mode so that the disk continues to be not spinning or spinning at a reduced rate of rotation. Data transfer logic executes the input/output request in the low power level mode by at least one of reading metadata from and writing metadata to the metadata storage instead of from/to the data storage media disk of the disk storage drive. In this manner, the duration of periods of reduced power consumption and cooling requirements may be extended while the input/output requests are directed to the metadata stored in the metadata storage.

Conversely, if the storage unit is currently operating in the full power level mode of operation in which the disk is spinning at a full operational rate of rotation when an input/output operation received by the storage unit is directed to data stored in the metadata storage and thus excludes non-metadata such as user data, for example, stored on the data storage media disk, the power level mode logic is again configured to maintain the power level mode at the full power level mode so that the disk continues to spin at the full operational rate of rotation. Here too, data transfer logic executes the input/output request in the full power level mode by at least one of reading metadata from and writing metadata to the metadata storage instead of from/to the data storage media disk of the disk storage drive. As a result, undesirable cycling between low and full power modes may be reduced.

In another aspect of the present description, the power level mode logic is further configured to, in response to changing the power level mode of the storage unit from the low power level mode to the full power level mode, initiate timing of a grace period of disk input/output idle time. The power level mode logic determines whether any input/output requests directed to data stored in a data storage location of the data storage media disk of the disk storage drive, is received within the grace period of disk input/output idle time. Upon expiration of the grace period of disk input/output idle time, if it is determined that no additional input/output request directed to data stored in a data storage location of the data storage media disk of the disk storage drive, is received within the grace period of disk input/output idle time, the power level mode logic changes the power level mode of the storage unit from the full power level mode back to the low power level mode. As a result, the rate of rotation of the data storage media disk is reduced from the full rate of rotation of the full power level mode back to the reduced rate of rotation (or stopped rotation) of the low power level mode, again reducing power consumption and potentially extending the life of the disk storage drive.

Furthermore, the duration of periods of increased power consumption and cooling requirements may be minimized and the duration of periods of reduced power consumption and cooling requirements may be increased. Moreover, the grace period of disk input/output idle time can reduce or eliminate undesirable cycling between low and full power level modes. It should be noted that in one embodiment, receipt of input/output operations directed to the metadata storage do not prevent the changing of the power level mode of the storage unit from the full power level mode back to the low power level mode if it is determined that no input/output requests directed to data stored in data storage locations of the data storage media disk of the disk storage drive, are received within the grace period of disk input/output idle time.

In embodiments having multiple disk storage drives configured in an array such as a RAID array, and controlled by an array controller such as a RAID controller, a metadata storage in accordance with the present description may be implemented as a non-volatile, non-disk memory added to the array controller, for example. In a manner similar to that described above, the metadata storage for the array of disk storage drives provides access to metadata concerning the associated array of disk storage drives in either the low power level mode while the disks of the array are not spinning or spinning at a reduced rate, or in the full power mode in which the disks of the array are spinning at the full rate of rotation.

In another aspect of the present description, storage locations within the metadata storage of the storage unit may be allocated to a portion of a system logical address space, in which the metadata address space portion is separate from the portion of the system logical address space allocated to storage locations of the data storage media disk of the storage unit. As a consequence, input/output operations limited to metadata stored exclusively in the metadata storage, may access the metadata storage and bypass accessing the data storage media disk of the storage unit. As a result, the storage unit may remain in the low power level mode for input/output operations limited to metadata stored exclusively in the metadata storage, and need not change to the full power level mode for input/output operations limited to such metadata.

It is seen from the above that a data storage system employing power level management in accordance with the present description may reduce power consumption and extend the life of storage components. Other aspects and advantages may be realized, depending upon the particular application.

A system of one or more computers may be configured for power level management in a data storage system in accordance with the present description, by virtue of having software, firmware, hardware, or a combination of them installed on the system that in operation causes or cause the system to perform power level management in accordance with the present description. For example, one or more computer programs may be configured to perform power level management in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Implementations of the described techniques may include hardware, a method or process, or computer software on a computer-accessible medium. FIGS. 1-4 illustrate an embodiment of a computing environment employing power level management in a data storage system in accordance with the present description. A plurality of hosts 1*a* (FIG. 3), 1*b* . . . 1*n* may submit Input/Output (I/O) requests over a network 6 to one or more data storage devices or systems 2*a*, 2*b*, to read or write data. The hosts 1*a*, 1*b* . . . 1*n* may be separate physical devices or may be virtual devices implemented using assigned resources of partitions of a server, for example. In a similar manner, the data storage systems 2*a*, 2*b* may be separate physical devices or may be virtual devices implemented using assigned resources of partitions one or more servers, for example.

In the illustrated embodiment, the data storage system 2*a* is a primary data storage system and the data storage system 2*b* is a secondary data storage system in which data stored on the primary data storage system 2*a* by a host is mirrored to the secondary data storage system 2*b*. Although the embodiment depicted in FIG. 1 depicts a single secondary data storage system 2*b*, it is appreciated that a primary data storage system 2*a* may have more than one secondary data storage system.

Figure 2:
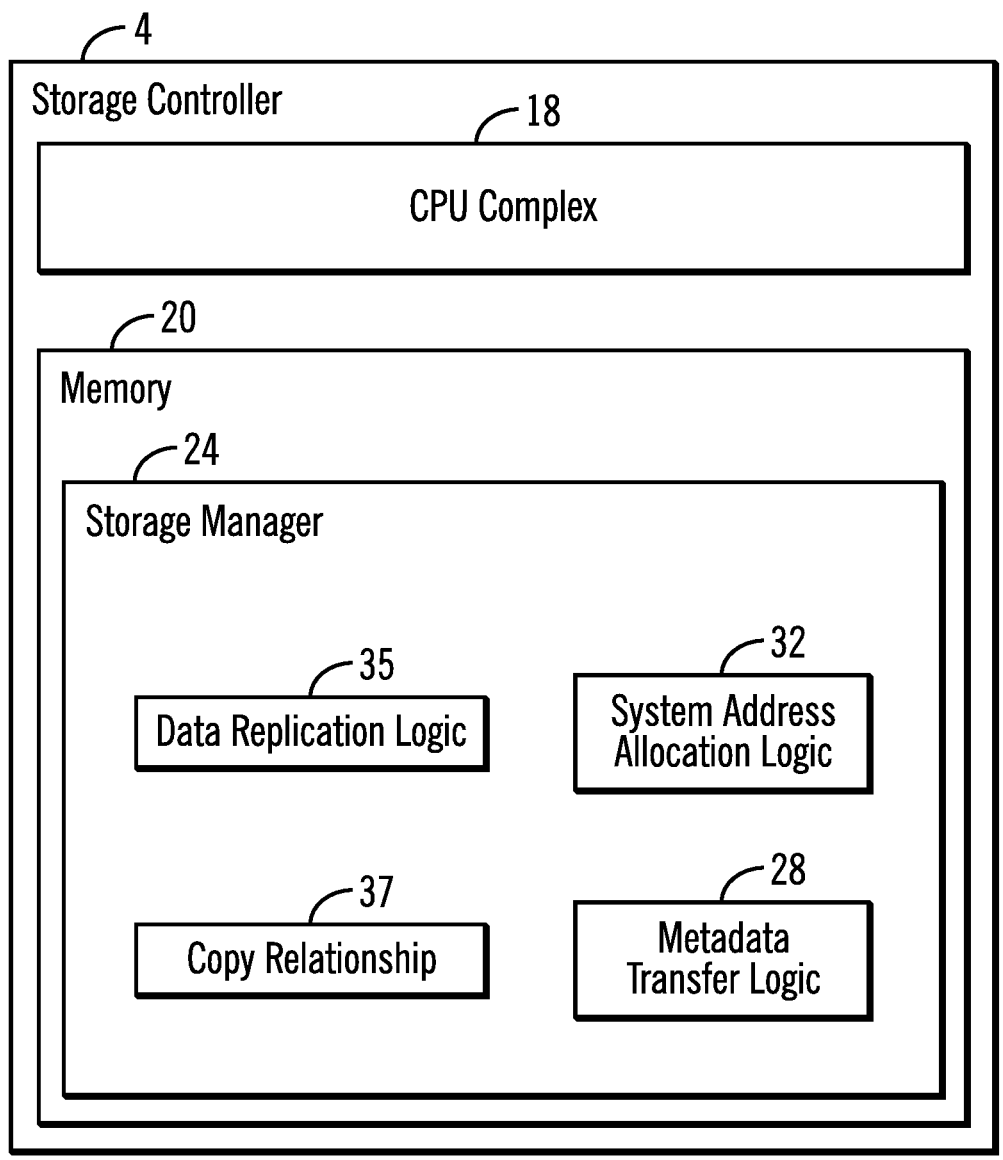
FIG. 2 illustrates an example of a storage controller of the computing environment of FIG. 1, employing power level management in accordance with one aspect of the present description.

Each data storage system 2*a*, 2*b* includes a storage controller or control unit 4*a*, 4*b*, respectively, an example of which is shown in greater detail in FIG. 2 as storage controller 4, which accesses data stored in multiple data storage units of storage 10*a*, 10*b*, respectively. In one aspect of power level management in a data storage unit in accordance with the present description, a data storage unit 12 (FIG. 4) of a storage 10*a*, 10*b* has a non-volatile, non-disk memory or storage 14 such as a solid state drive, for example, referred to herein as "metadata storage" 14 which is configured in parallel to a disk storage drive 15 of the storage unit 12. The parallel metadata storage 14 provides direct access to metadata stored exclusively on the metadata storage 14 whether or not the data storage media disk 16 of the disk storage drive 15 is stopped or spinning at a reduced rate of rotation in a low power level mode of operation.

It is appreciated that one or more other data storage units of the storage 10*a*, 10*b* may comprise any suitable device capable of storing data, such as physical hard disks, solid state drives, tape drives, etc., known in the art. Thus, in one embodiment, the storage 10*a*, 10*b* may be further comprised of one or more sequential access storage devices, such as hard disk drives and magnetic tape drives or may include non-sequential access storage devices such as solid state drives (SSD), for example. Such additional devices of storage 10*a*, 10*b* may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 10*a*, 10*b* may also be other types of storage such as solid state drives in a RAID configuration to facilitate data recovery in the event of loss of a solid state drive. The storage units of the storage 10*a*, 10*b* may be configured to store data in subunits of data storage such as volumes, tracks, etc.

Each storage controller 4 (FIG. 2), 4*a*, 4*b* includes a CPU complex 18 (FIG. 2) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4*a*, 4*b* further has a memory 20 that includes a storage manager 24 for managing storage operations including writing data to or reading data from a storage unit 12 (FIG. 4) or other storage units of an associated storage 10*a*, 10*b* in response to an I/O data request from a host or mirrored data from another data storage system. A cache of the memory 20 may comprise one or more of different types of memory, such as RAMs, write caches, read caches, NVS, etc. The different types of memory that comprise the cache may interoperate with each other. The CPU complex 18 of each storage controller 4 (FIG. 2), 4*a*, 4*b* may have multiple clusters of processors, each cluster having its own assigned memory 20, storage manager 24, cache, etc. The processing and memory resources assigned each cluster may be physical, virtual, shared, transferable or dedicated, depending upon the particular application.

In one aspect of the present description, the storage manager 24 includes metadata transfer logic 28 which is configured to transfer metadata directly between the metadata storage 14 of the storage unit 12 and the storage controller 4, independently of the data storage media disk 16 of the storage unit 12. System address allocation logic 32 of the storage manager 24 is configured to automatically allocate unique addresses, logical or physical, to storage locations of the metadata storage 14 so that the metadata transfer logic 28 can access storage locations in the metadata storage 14 to write metadata in or read metadata from the metadata storage 14, bypassing entirely the storage locations of the data storage media disk 16. As a result, metadata may be obtained from or stored into the metadata storage 14 without rotating the data storage media disk 16. In this manner, power consumption may be reduced.

Figure 4:
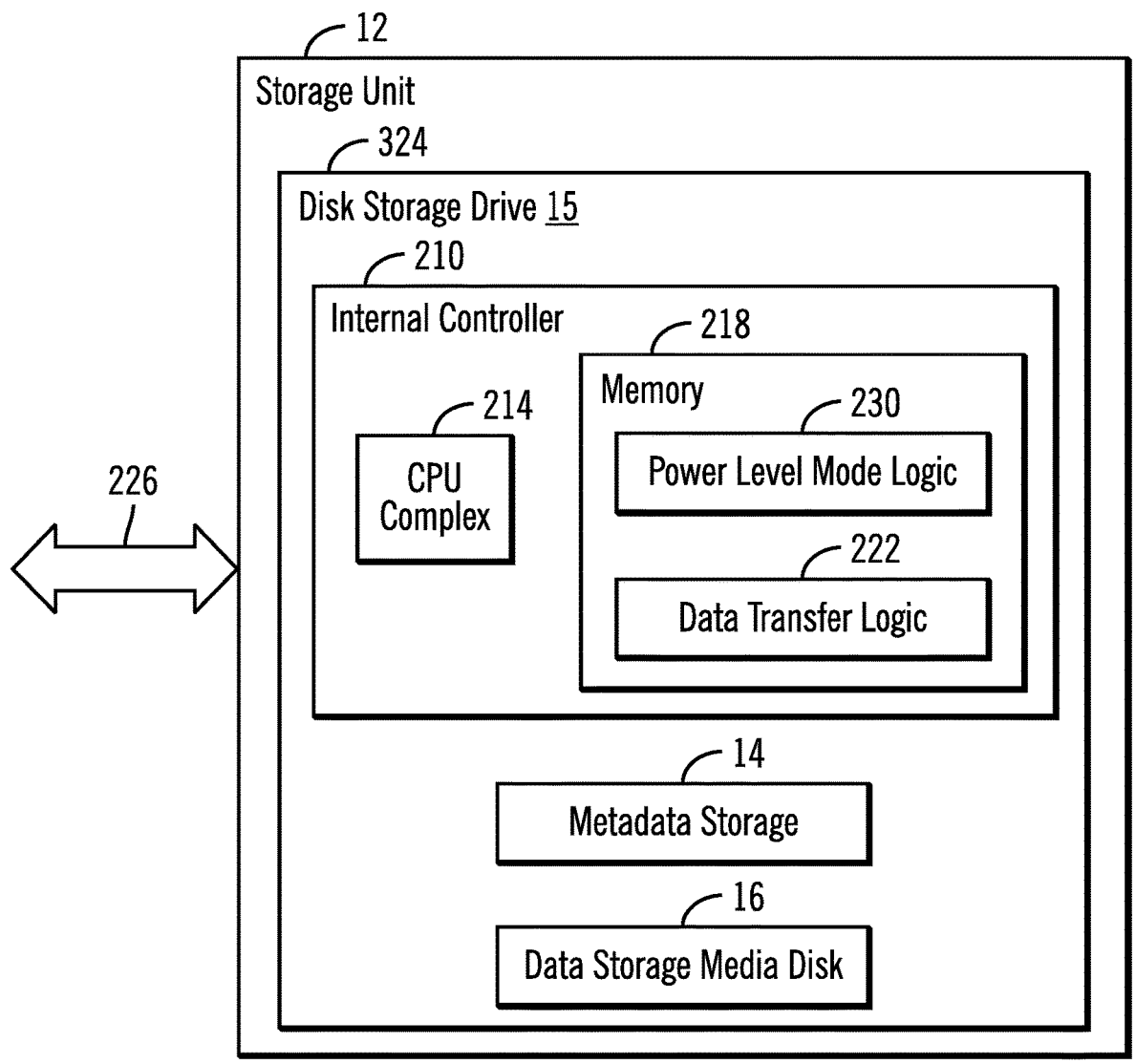
FIG. 4 illustrates an example of a storage unit of the computing environment of FIG. 1, employing power level management in accordance with one aspect of the present description.
Figure 5:
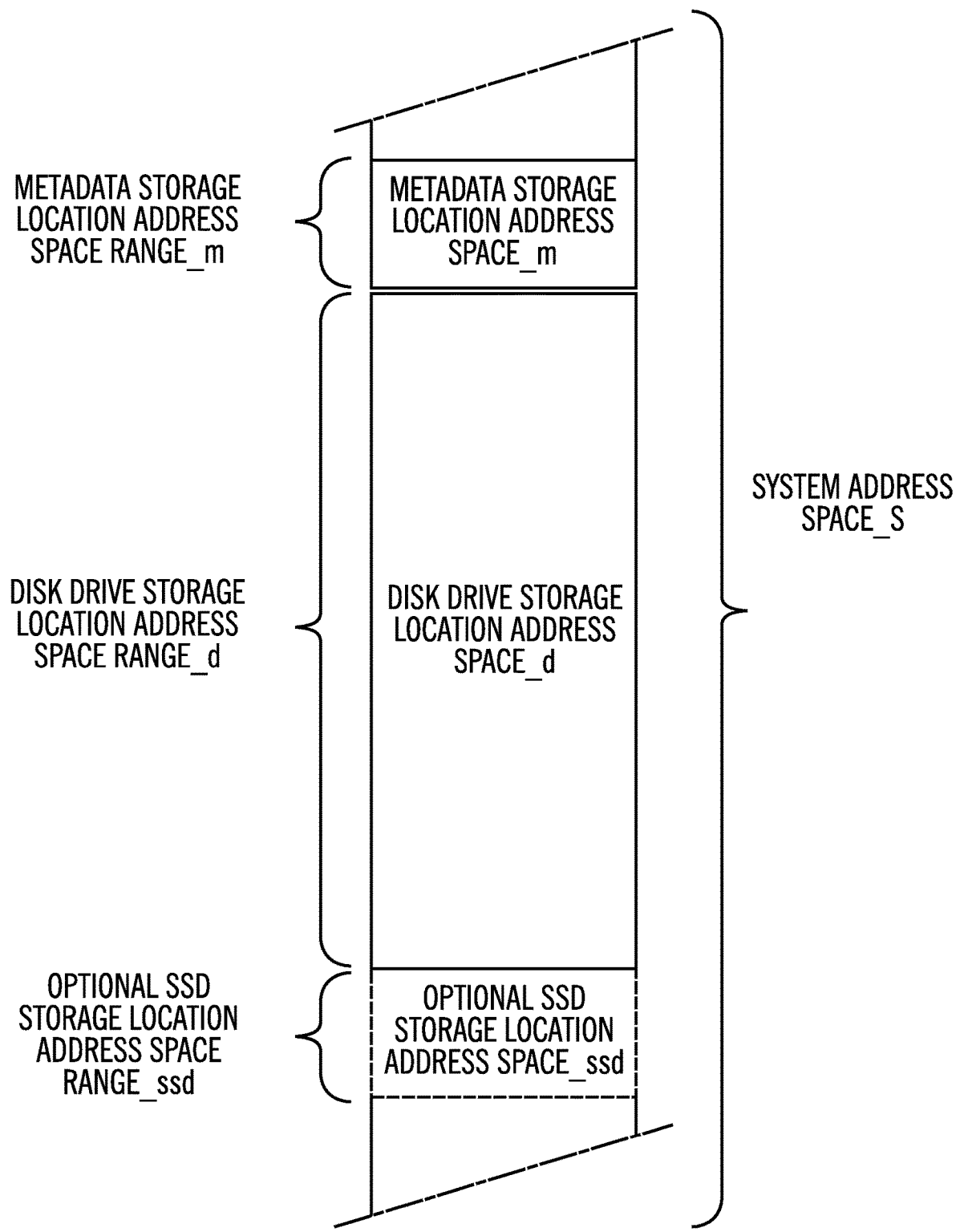
FIG. 5 illustrates an example of system address space allocations in a data storage system employing power level management in accordance with one aspect of the present description.

FIG. 5 shows an example of a logical system storage address space, space_S, which has been subdivided into various smaller address spaces including a metadata storage location address space, space_m, and a disk drive storage location address space, space_d. The metadata storage location address space_m extends over one or more ranges of logical storage addresses which have been allocated to the physical data storage locations of the metadata storage 14 (FIG. 4). In the example of FIG. 5, the metadata storage location address space_m extends over a range, range_m, of logical storage addresses which have been allocated to the physical data storage locations of the metadata storage 14 (FIG. 4).

In a similar manner, the disk drive storage location address space_d extends over one or more ranges of logical storage addresses which are different from the range or ranges of logical storage addresses allocated to the physical data storage locations of the metadata storage 14 (FIG. 4). In the example of FIG. 5, the metadata storage location address space_d extends over a range, range_d, of logical storage addresses which have been allocated to the physical data storage locations of the data storage media disk 16 of the disk storage drive 15 (FIG. 4). Because the logical storage addresses allocated to the metadata storage 14 are different from the logical storage addresses allocated to the data storage media disk 16, a storage controller such as the storage controller 4 (FIG. 2) may address and access the metadata storage locations of the metadata storage 14 separately and independently of the data storage locations of the data storage media disk 16 (FIG. 4).

Logical addresses may be allocated to the storage locations of the storage unit 12 by the system address allocation logic 32 (FIG. 2) using any suitable allocation technique modified as appropriate in a data storage system employing power level management in a in accordance with the present description. For example, system address allocation logic 32 of an operating system of the storage controller 4 may be configured to poll the storage unit 12 to ascertain logical address locations mapped to physical storage locations of the metadata storage 14 for reading metadata from or writing metadata to the physical storage locations of the metadata storage 14.

In another embodiment, system address allocation logic 32 of an operating system of the storage controller 4 (FIG. 2) may specify to the storage unit 12, the logical system addresses which have been allocated by the storage controller 4 to the metadata storage 14 for storing and retrieving metadata. An internal controller of the storage unit 12 may be configured to, in response to the system address allocation by the storage controller 4, comply with this directive of the storage controller 4, mapping physical storage locations of the metadata storage 14 to the system addresses allocated to the metadata storage 14 by the system address allocation logic 32 of the storage controller 4. Thus, in some embodiments, system address allocation logic 32 of an operating system of the storage controller 4 can assign logical system addresses to any physical storage location of the metadata storage 14.

It is further appreciated that the allocation of logical system addresses for storing metadata in the metadata storage 14 may be customized as a function of the type of file system being used for storing data in the metadata storage 14 and the disk storage drive 15. For example, the metadata stored by the metadata storage 14 may include a file allocation table (FAT) or file directory of files stored on the data storage media disk or disks 16 of the disk storage drive 15. The data structure of the file directory may vary depending upon the particular type of file system being used. Accordingly, logical system addresses may be allocated to physical storage locations of the metadata storage 14 in a manner which facilitates efficient storage and retrieval of the metadata identifying which files are stored on the data storage media disk or disks 16 of the disk storage drive 15, the status of such files, etc.

In another aspect of the present description, logical system addresses may be allocated by system address allocation logic 32 to the metadata storage 14 for storing metadata in the metadata storage 14 as a function of the type of storage unit 12 having the metadata storage 14. For example, a storage unit 12 may have an internal controller which itself utilizes metadata stored in the metadata storage 14. Such metadata may include in addition to metadata such as file directory metadata as described above, storage unit configuration data representing configuration of the storage unit, as well as status information concerning the status of the storage unit, its components, and its features, for example.

Thus, metadata input/output operations directed to the metadata storage 14 may be initiated not only by an external processor such as the storage controller 4, but also by an internal processor such as an internal controller of the storage unit 12. As a result, an internal controller can access metadata stored in the metadata storage 14 notwithstanding that the data storage media disk or disks of the disk storage drive 15 are slowed or stopped in a low power level mode.

Physical storage locations of the metadata storage 14 storing metadata which are directly accessible by both an internal controller of the storage unit and by an external controller such as the storage controller 4, or are accessible solely by an external controller such as the storage controller 4, may in one embodiment, be allocated logical system addresses in a manner similar to that described above. Thus, an internal controller may be configured to make some portion of the metadata storage 14 available to an external controller such as the storage controller 4 for accessing metadata such as file directory metadata or other metadata useful to the storage controller 4.

Conversely, physical storage locations of the metadata storage 14 storing metadata which are accessible solely by an internal controller of the storage unit, may in one embodiment, be allocated logical local system addresses by the internal controller independently of logical system addresses. In other embodiments, physical storage locations of the metadata storage 14 storing metadata which are accessible solely by an internal controller of the storage unit, may be allocated logical system addresses in a manner similar to that described above.

It is further appreciated that file directory and other types of metadata may be stored in the metadata storage 14 as records in a database format. In such applications, allocation of logical system addresses to physical storage locations of the metadata storage 14 may be determined as a function of operational parameters of the database application.

It is seen from the above that address space allocation in accordance with the present description facilitates separate access to the metadata storage by an external processor such as a storage controller processor, or by an internal processor such as a storage unit processor. Thus, a metadata input/output request may be received either from a processor external to the storage unit or a processor internal to the storage unit. Metadata may then be transferred between the storage unit input and the metadata storage of the storage unit in the first power level mode, for example, in response to a received metadata input/output request whether from an internal or external processor.

The storage manager 24 of the illustrated embodiment further includes a data replication logic 35 (FIG. 2) of the storage manager 24 which is configured to synchronously generate copies of the primary volume1 (FIG. 1) of the primary data storage system 2a as a secondary volume2 (FIG. 1) of the secondary data storage systems as represented by the secondary data storage system 2b. A primary-secondary pair of volumes, volume1, volume2 are in a synchronous copy or mirror relationship 37 such that updates to the primary volume1 are synchronously mirrored to each secondary volume2.

In the illustrated embodiment, volumes containing user operational data are stored on suitable high capacity storage devices such as the data storage media disk 16 of the storage unit 12. Conversely, volumes containing user operational data are not stored in the metadata storage 14 (FIG. 4) which is reserved for storing metadata exclusively in one embodiment. It is appreciated that in some applications, high capacity storage devices such as the data storage media disk 16 of the storage unit 12 may store some metadata not stored in the metadata storage 14, such as metadata which is infrequently accessed, or parity data, for example. Also, if the capacity of the metadata storage 14 is reached, metadata in excess of that capacity may be stored in the data storage media disk 16.

One or more copy relationships 37, which may be maintained by the data replication logic 35 for the primary and secondary storage controllers 4a, 4b, (FIG. 1) associate primary storage locations in the primary storage 10a and corresponding secondary storage locations in each of the secondary storage drives as represented by the storage 10b of the mirror relationship, such that updates to locations of the primary storage 10a are mirrored, that is, copied to the corresponding locations of the secondary storage 10b. For example, source storage locations in a primary storage volume1 (FIG. 1) of storage 10a may be synchronously mirrored in a mirror data replication operation to target storage locations of a secondary volume2 of the storage 10b pursuant to a mirror copy relationship 37 (FIG. 2). Similarly, source storage locations in the primary storage volume1 (FIG. 3) of storage 10a may be synchronously mirrored in a mirror data replication operation to additional target storage locations of another secondary volume2 of another secondary data storage system pursuant to a mirror copy relationship 37 (FIG. 2).

In the illustrated embodiment, a copy relationship 37 comprises a peer-to-peer synchronous mirror relationship for a pair of storage locations in which updates to the primary (source) storage locations of the mirror relationship 37 are synchronously mirrored to the secondary (target) storage locations of the mirror relationship 37. It is appreciated that other types of copy relationships such as asynchronous, for example, may be established, depending upon the particular application.

In the configuration illustrated in FIG. 1, the storage controller 4a and the data storage 10a have been configured as a primary storage control unit and the primary storage, respectively, of a primary data storage system 2a. Similarly, the storage controller 4b and its data storage 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b. In this embodiment, there may be multiple secondary data storages such that a copy relation can be in a one to many relationship, which is also referred to as a multi-target relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

One mode of the data replication logic 35 managing the copy relationships, may be implemented with synchronous copy operations, such as a peer-to-peer remote copy (PPRC) program modified as appropriate in accordance with present description. The described operations may be implemented with other programs such as other copy programs or other global recovery programs modified as appropriate in accordance with present description.

In the illustrated embodiment, the storage manager 24 including the metadata transfer logic 28 and the system address allocation logic 32, is depicted as software stored in the memory 20 and executed by the CPU complex 18. However, it is appreciated that the logic functions of the storage manager 24 may be implemented as hardware, software, firmware or combinations of one or more thereof, depending upon the particular application.

The storage manager 24 (FIG. 2) in one embodiment may store data in the cache and transfer data between the cache and storage 10a, 10b (FIG. 1) in tracks. Similarly, the storage manager 24 (FIG. 2) in one embodiment may transfer data from the primary storage 10a (FIG. a) to a secondary storage 10b in tracks. As used herein, the term track may refer to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in input/output operations in accordance with the present description may vary, depending upon the particular application. Thus, as used herein, the term "track" or the term "segment" refers to any suitable subunit of data storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 3:
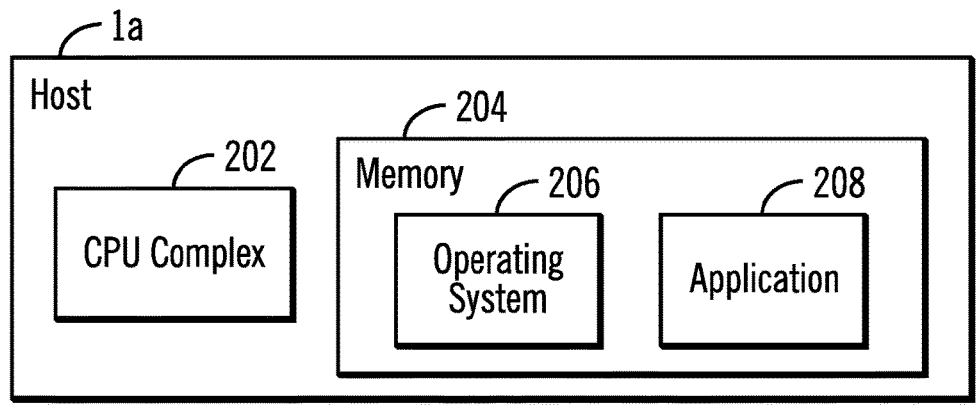
FIG. 3 illustrates an example of a host of the computing environment of FIG. 1.

A typical host as represented by the host 1a of FIG. 3 includes a CPU complex 202 and a memory 204 having an operating system 206 and an application 208 that cooperate to read data from and write data updates to the storage 10a, 10b via a storage controller 4, 4a, 4b. An example of a suitable operating system is the z/OS operating system. It is appreciated that other types of operating systems may be employed, depending upon the particular application.

The disk storage drive 15 (FIG. 4) of the storage unit 12 includes an internal controller 210 which controls the operations of the disk storage drive 15 including the metadata storage 14 of the storage unit 12. The internal controller 210 includes a CPU complex 214 having one or more processors or central processing units, each having a single or multiple processor cores. As previously mentioned, in this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

The internal controller 210 further has a memory 218 that includes data transfer logic 222 configured to transfer data between a storage unit input 226 and the data storage media disk 16 of the storage unit 12 in a full power level mode in which reading data from and writing data to the data storage media disk of the disk storage drive is enabled. Although the embodiment of FIG. 4 depicts a single data storage media disk 16, it is appreciated that a disk storage drive of a storage unit employing power level management in accordance with the present description may have multiple data storage media disks depending upon the particular application. For example, a RAID disk storage drive may have multiple disks.

In one aspect of the present description, the data transfer logic 222 is further configured to transfer metadata between the storage unit input 226 and the metadata storage 14 of the storage unit in a low power level mode which has a reduced level of power expenditure as compared to the full power level mode. In the illustrated embodiment, the data storage media disk 16 of the disk storage drive 15 is configured to be rotated by a motor controlled by the internal controller 210 at a full operational rate of rotation in the full power level mode such that reading data from and writing data to the data storage media disk 16 of the disk storage drive 15 is enabled in the full power mode. By comparison, in the low power mode, rotation of the data storage media disk 16 of the disk storage drive 15 is stopped by cutting all power to the motor or in some embodiments, power is reduced to the motor controlled by the internal controller 210 so that the disk spins at a slower rate of rotation as compared to that of the full operational rate of rotation of the full power level mode. In the low power level mode in which rotation of the data storage media disk 16 is stopped or slowed to a lower rate of rotation, reading data from and writing data to the data storage media disk 16 of the disk storage drive 15 may be disabled but reading data from and writing data to the metadata storage 14 remains enabled.

Because the rate of rotation of the data storage media disk 16 in the lower power level mode is within a slower range which includes zero revolutions per minute, the low power level mode has a reduced level of power expenditure as compared to the full power level mode. As a result, power consumption may be reduced while performing input/output operations limited to metadata transfers between the storage unit input/output 226 and the metadata storage 14.

The memory 218 of the internal controller 210 further includes power level mode logic 230 configured to automatically and selectively change or maintain the power level mode of operation of the storage unit 12 as a function of the storage location to which a received input/output operation is directed, and as a function of the current power level mode of operation of the storage unit. In one embodiment, the storage location to which a received input/output operation is directed, may be readily ascertained as a function of the logical system address to which the input/output operation is directed.

Thus in the example of FIG. 5, an input/output logical address that is within the metadata storage address space range_m may be readily determined to be directed to read metadata from or write metadata to the metadata storage 14 of the storage unit 12. Conversely, an input/output logical address that is within the disk drive storage location address space range_d may be readily determined to be directed to read data from or write data to the data storage media disk 16 of the storage unit 12.

Accordingly, in one embodiment, in response to receiving an input/output request directed to a logical address within the disk drive storage location address space ranged (FIG. 5) such that it is directed to a data storage location of the data storage media disk 16 of the disk storage drive 15, and if the storage unit 12 is in a low power level mode in which reading data from and writing data to the data storage media disk 16 of the disk storage drive 15 is disabled, the power level mode logic 230 is configured to change the power level mode of the storage unit 12 from the low power level mode to the full power level mode. In changing the power level mode from the low power level mode to the full power level mode, the power level mode logic 230 is configured to cause the internal controller 210 to cause the motor of the disk drive 15 to increase the rate of rotation of the data storage media disk 16 from zero (stopped) or a low rate of rotation of the low power level mode to the full operational rate of rotation of the full power level mode. Once the full rate of rotation of the disk storage media disk 16 is achieved, the data transfer logic 222 is configured to execute the received input/output request in the full power level mode to either read data from or write data to the data storage media disk 16 of the disk storage drive.

Conversely, if the storage unit 12 is in the full power level mode when an input/output operation directed to a data storage location of the data storage media disk 16 of the disk storage drive 15 is received, the power level mode logic 230 is configured to maintain the power level mode at the full power level mode since read and write operations to the disk storage media disk 16 are enabled in the full power mode. If a received input/output request is directed to a logical address within the metadata location address space range_m (FIG. 5) such that is directed to the metadata storage 14, the power level mode logic 230 is configured to maintain the power level mode at its current power level mode since read and write operations to the metadata storage 14 are enabled in both the low power level mode and the full power level mode.

In the illustrated embodiment, the data transfer logic 222 and the power level mode logic 230 of the internal controller 210 are depicted as software stored in the memory 218 and executed by the CPU complex 214. However, it is appreciated that logic functions of the internal controller 210 may be implemented as hardware, software, firmware or combinations of one or more thereof, depending upon the particular application.

Figure 6:
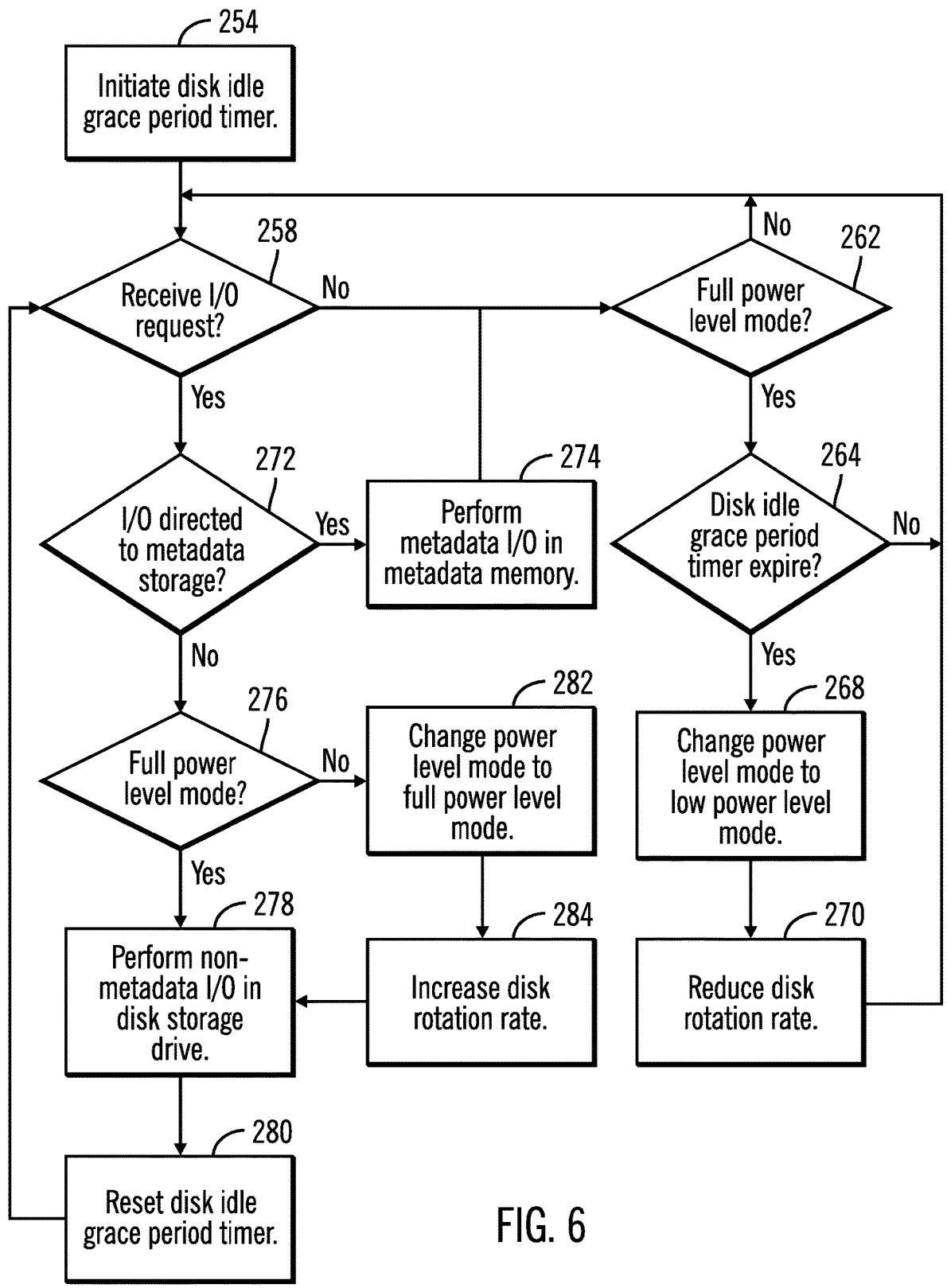
FIG. 6 is an example of operations of a storage unit employing power level management in accordance with one aspect of the present description.

FIG. 6 depicts one example of operations of the internal controller 210 (FIG. 4) of the storage unit 12. In this embodiment, the power level mode logic 230 (FIG. 4) initiates (block 254, FIG. 6) a grace period timer to time a grace period of disk idle time. As explained below, if the grace period expires without receipt during this grace period, of an input/output operation directed to the data storage media disk 16 while the storage unit 12 (FIG. 4) is in the full power level mode, the power level mode logic 230 changes the power level mode of the storage unit 12 from the full power level mode to the low power level mode.

The power level mode logic 230 is configured to determine (block 258, FIG. 6) whether an input/output operation has been received from the storage controller 4 (FIG. 2). If not, the power level mode logic 230 is further configured to determine (block 262, FIG. 6) whether the storage unit 12 is currently in the full power mode. If not, the power level mode logic 230 continues to wait (block 258) in the low power level mode for an input/output operation.

Conversely, if the power level mode logic 230 determines (block 262) that the storage unit 12 is currently in the full power mode, the power level mode logic 230 is configured to determine (block 264, FIG. 6) whether the disk idle grace period timer has expired. If so, the power level mode logic 230 is configured to change (block 268, FIG. 6) the power level mode of the storage unit 12 from the full power level mode to the low power level mode. In changing the power level mode to the low power level mode, the power level mode logic 230 is configured to cause the internal controller 210 (FIG. 4) of the storage unit 12 to cause the motor of the disk storage drive 15 to reduce (block 270, FIG. 6) the rate of rotation of the data storage media disk 16 (FIG. 4) of the disk storage drive 15. In the full power level mode, the data storage media disk 16 spins at a rate of rotation referred to herein as a full operational rate of rotation which is sufficient for input/output operations to be performed directed to the data storage media disk 16. As a result, in the full power level mode, input/output operations to the data storage media disk 16 are enabled.

Conversely, in the low power level mode, the data storage media disk 16 is stopped or spins at a reduced rate of rotation which is lower than the full operational rate of rotation and is insufficient for input/output operations to be performed directed to the data storage media disk 16. As a result, in one embodiment of the low power level mode, input/output operations to the data storage media disk 16 may be fully disabled whether the data storage media disk 16 is fully stopped or spinning at a reduced rate of rotation. However, power consumption by the storage unit 12 is reduced in the low power level mode.

It is appreciated that in some embodiments of a low power level mode in accordance with the present description, the data storage media disk 16 may spin at a reduced rate of rotation which is lower than the full operational rate of rotation yet which may be sufficient for limited (less than full operational level) input/output operations to be performed directed to the data storage media disk 16. As a result, in one embodiment of the low power level mode, input/output operations to the data storage media disk 16 may only be partially disabled.

Upon receipt (block 258) of an input/output request from the storage controller 4, the power level mode logic 230 is configured to determine (block 272, FIG. 6) whether the received input/output operation is directed to the metadata storage 14 (FIG. 4). As previously mentioned, in the example of FIG. 5, an input/output logical address that is within the metadata storage address space range_m may be readily determined to be directed to read metadata from or write metadata to the metadata storage 14 of the storage unit 12. Conversely, an input/output logical address that is within the disk drive storage location address space range_d may be readily determined to be directed to read data from or write data to the data storage media disk 16 of the storage unit 12. If the I/O operation is directed to the metadata storage 14, the data transfer logic 222 (FIG. 4) of the internal controller 210 is configured to perform (block 274, FIG. 6) the requested metadata input/output operation directed to the metadata storage 14.

Here too, the power level mode logic 230 determines (block 262, FIG. 6) whether the storage unit 12 is currently in the full power mode and if not, continues to wait (block 258) in the low power level mode for another input/output operation. Conversely, if the power level mode logic 230 determines (block 262) that the storage unit 12 is currently in the full power level mode, the power level mode logic determines (block 264, FIG. 6) whether the idle grace period timer has expired. If so, as described above, the power level mode logic 230 changes (block 268, FIG. 6) the power level mode of the storage unit 12 from the full power level mode to the low power level mode and causes the internal controller to reduce (block 270, FIG. 6) (or stop) the rate of rotation of the data storage media disk 16 (FIG. 4) of the disk storage drive 15. Conversely, if the power level mode logic 230 determines (block 264, FIG. 6) that the idle grace period timer has not expired, the power level mode logic 230 continues to wait (block 258) in the full power level mode for another input/output operation until the idle grace period timer expires (block 264).

Upon receipt (block 258) of an input/output request from the storage controller 4, and upon a determination (block 272, FIG. 6) that the received input/output operation is not directed to the metadata storage 14 (FIG. 4) but is instead directed to the data storage media disk 16, the power level mode logic 230 determines (block 276, FIG. 6) whether the storage unit 12 is currently in the full power mode. If so, the data transfer logic 222 (FIG. 4) of the internal controller 210 is configured to perform (block 278, FIG. 6) the requested disk data input/output operation directed to the data storage media disk 16. In addition, the data transfer logic 222 (FIG. 4) of the internal controller 210 is configured to cause the power level mode logic 230 to reset (block 280, FIG. 6) the idle grace period timer to start the timing of another idle grace period.

If the power level mode logic 230 determines (block 276, FIG. 6) that the storage unit 12 is currently in the low power mode, the power level mode logic 230 is configured to change (block 282, FIG. 6) the power level mode of the storage unit 12 from the low power level mode to the full power level mode. In changing the power level mode to the full power level mode, the power level mode logic 230 is configured to cause the internal controller 210 (FIG. 4) of the storage unit 12 to increase (or start and increase) (block 284, FIG. 6) the rate of rotation of the data storage media disk 16 (FIG. 4) of the disk storage drive 15. As noted above, in the full power level mode, the data storage media disk 16 spins at a rate of rotation referred to herein as a full operational rate of rotation which is sufficient for input/output operations to be performed directed to the data storage media disk 16. As a result, in the full power level mode, input/output operations to the data storage media disk 16 are enabled.

Accordingly, the data transfer logic 222 (FIG. 4) of the internal controller performs (block 278, FIG. 6) the requested disk data input/output operation directed to the data storage media disk 16. In addition, the data transfer logic 222 causes the power level mode logic 230 (FIG. 4) of the internal controller 210 to reset (block 280, FIG. 6) the idle grace period timer to start the timing of another idle grace period.

Figure 7:
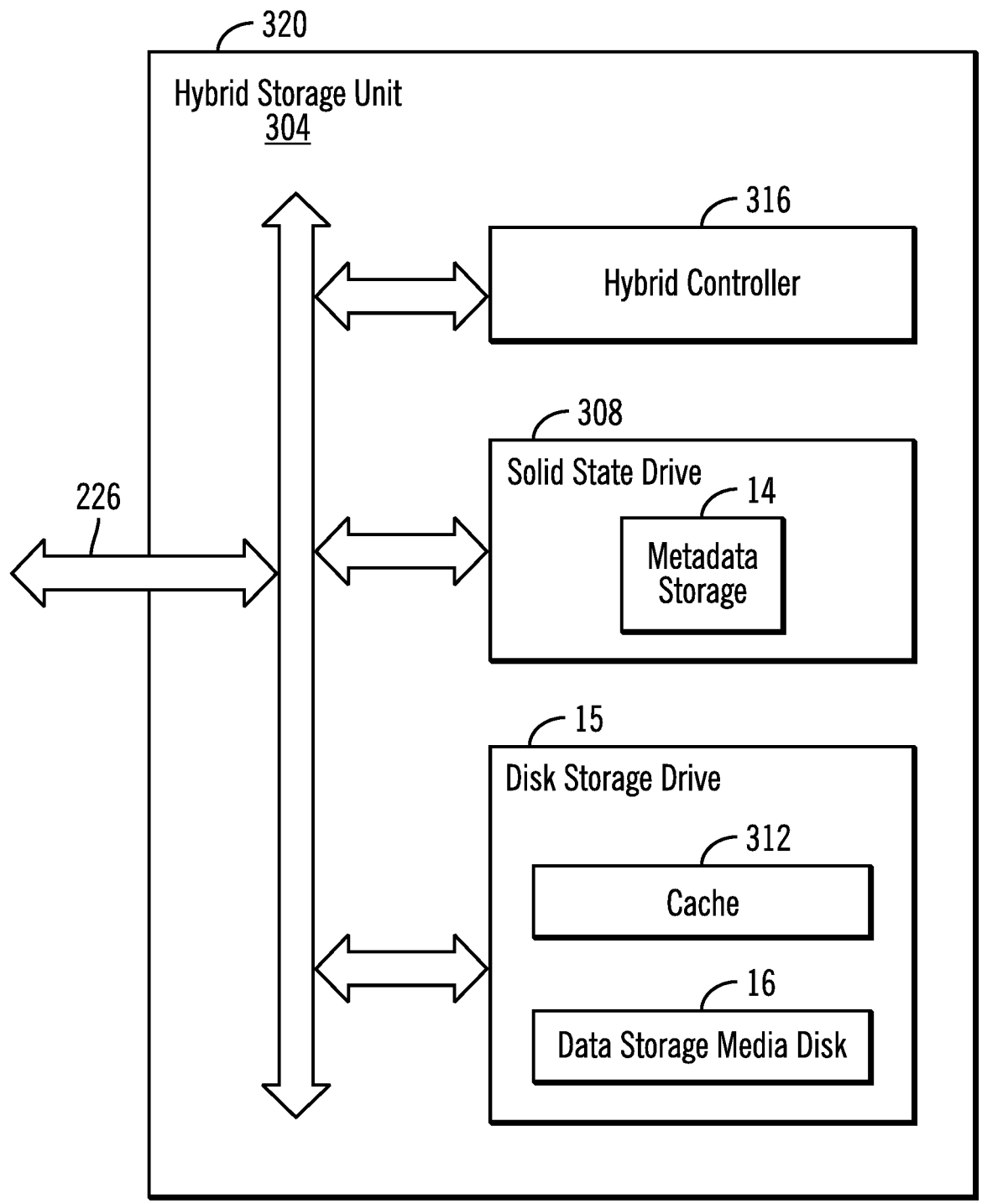
FIG. 7 is an example of a hybrid storage unit employing power level management in accordance with one aspect of the present description.

FIG. 7 shows an embodiment in which a hybrid storage unit 304 includes a metadata storage 14 similar to the metadata storage 14 of FIG. 4. Accordingly, metadata input/output operations having logical storage addresses within the range_m (FIG. 5) may be directed by the storage controller 4 directly to the metadata storage 14 of FIG. 7. As noted above, the metadata storage 14 is dedicated to storing exclusively metadata in one embodiment. However, in the embodiment of FIG. 7, the metadata storage 14 is implemented in a reserved portion of the storage locations of a solid state drive 308. The remaining portion of the storage locations of the solid state drive 308 which are not utilized by the metadata storage 14, may optionally be allocated a portion of the system space_S. The portion of the system address space_S allocated to the storage locations of the solid state drive 308 which are not utilized by the metadata storage 14, is SSD storage location address space_ssd in the example of FIG. 5. Accordingly, data input/output operations having logical storage addresses within the range_ssd (FIG. 5) may be directed by the storage controller 4 directly to the portion of the solid state drive 308 which does not include the metadata storage 14 of FIG. 7. The data input/output operations having logical storage addresses within the range_ssd (FIG. 5) for the solid state drive 308 may be performed in either the low power mode or the full power mode and may include non-metadata such as user data, for example. Thus, in this embodiment, input/output operations having logical storage addresses within either the metadata storage range_m or the range_ssd (FIG. 5) for the solid state drive 308 may be performed in either the low power mode or the full power mode.

The hybrid storage unit 304 further includes a disk storage drive 15 similar to the disk storage drive 15 of FIG. 4. Accordingly, input/output operations having logical storage addresses within the range_d (FIG. 5) may be directed by the storage controller 4 to the disk storage drive 15 of FIG. 7. In this embodiment, the disk storage drive 15 includes a high speed, low capacity front end, such as a solid state drive which is configured as a cache 312 for data to be written to or read from the data storage media disk 16 of the disk storage drive 15. Thus, read operations directed to logical addresses of the data storage media disk 16 are satisfied with data present in the cache 312 if that data has previously been staged in the cache 312. Conversely, if the data needed to satisfy the read request is not present in the cache 312, the requested data is staged from the data storage media disk 16 to the cache 312 to satisfy the read request. Write operations directed to logical address of the data storage media disk 16 may initially write the data to the cache 312 for subsequent destaging to the data storage media disk 16.

The hybrid storage unit 304 further includes an internal controller 316 which is similar to the internal controller 210 (FIG. 4) of the storage unit 12. Thus, the internal controller 316 has data transfer logic and power level mode logic similar to the data transfer logic 222 and the power level mode logic 230 of the internal controller 210 of FIG. 4. In the embodiment of FIG. 7, the internal controller 316 is disposed within the interior of an external housing or enclosure 320 of the hybrid storage unit 304. In the embodiment of FIG. 4, the internal controller 210 is within the interior of a housing or enclosure 324 of the disk storage drive 15 disposed within the interior of the storage unit 12. It is appreciated that an internal controller such as the internal controller 210 or 316, in a data storage system employing power level management in accordance with the present description, may be physically disposed in a variety of locations internal or external to the storage unit or internal or external to the internal components of the storage unit such as the metadata storage or disk storage drive.

In one embodiment of the hybrid storage unit 304 of FIG. 7, input/output operations between the storage controller 4 (FIG. 2) and the cache 312 may be performed in either the low power mode or the full power mode, depending upon the current power level mode of the storage unit 304. By comparison, input/output operations such as stage and destage operations between the cache 312 and the data storage media disk 16 may be limited to be performed in the full power mode. Thus, should the data storage unit 304 be currently in the low power mode and a stage or destage operation is to be conducted by the disk storage drive 15, power level mode logic of the internal controller 316 changes the power level mode of the storage unit 304 prior to the data transfer logic of the internal controller 316 initiating the stage or destage operation between the cache 312 and the data storage media disk 16. Conversely, should the data storage unit 304 be currently in the full power mode and no stage or destage operation is conducted in an idle grace period initiated following the last prior stage or destage operation, power level mode logic of the internal controller 316 changes the power level mode of the storage unit 304 back to the low power level mode until the next stage or destage operation between the cache 312 and the data storage media disk 16 is to be conducted.

Figure 8:
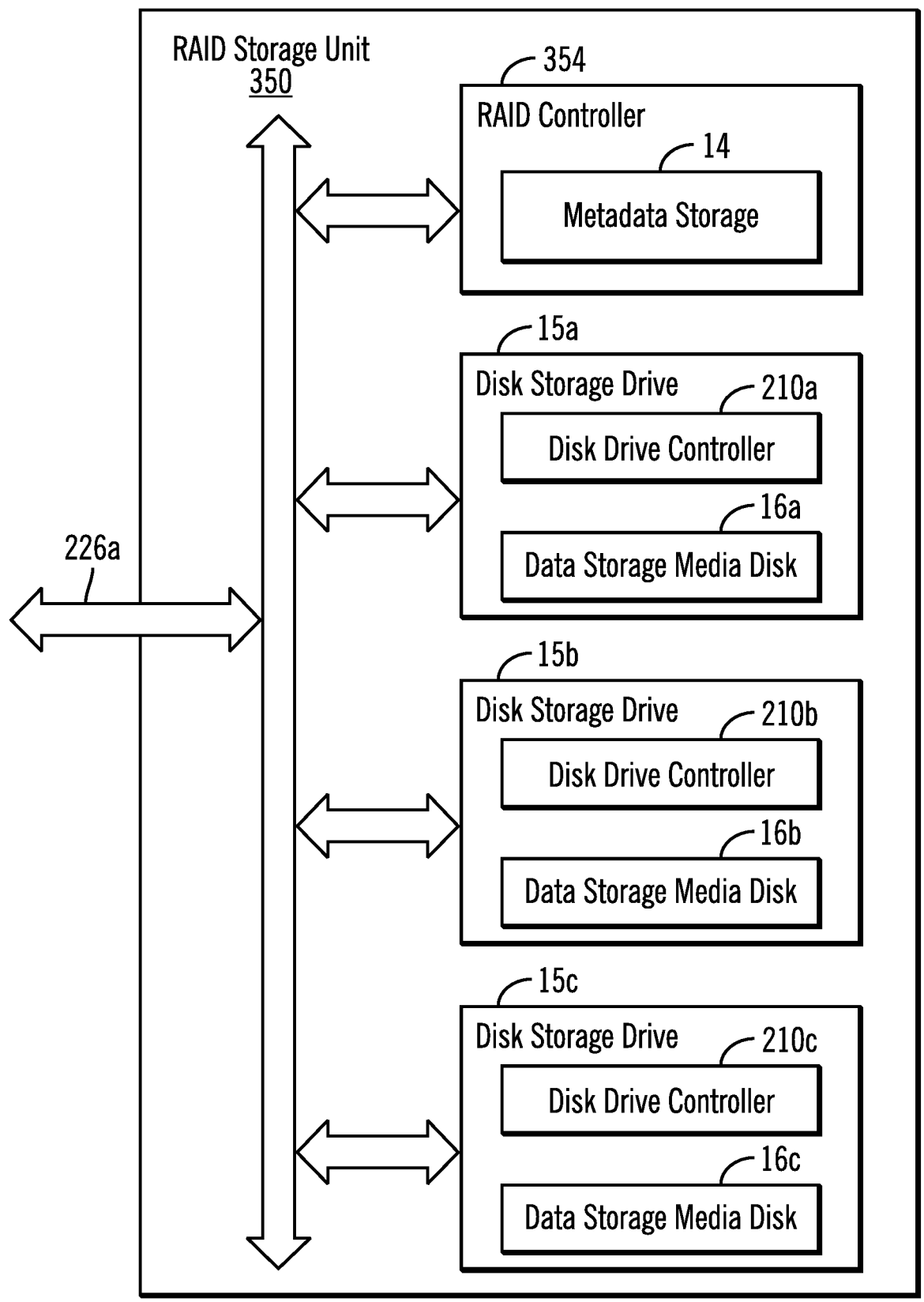
FIG. 8 is an example of a Redundant Array of Independent Disks (RAID) storage unit employing power level management in accordance with one aspect of the present description.

FIG. 8 depicts another embodiment of a storage unit employing power level management in accordance with the present description. In this embodiment, a storage unit 350 includes an array of disk storage drives as represented by multiple disk storage drives 15*a*, 15*b*, 15*c*, configured as a Redundant Array of Independent Disk (RAID) storage array to facilitate data recovery in the event of loss of a disk storage drive. The storage unit 350 further includes a RAID controller 354 having a metadata storage 14 similar to the metadata storage 14 of the storage unit 12 of FIG. 4.

The RAID controller 354 performs RAID functions including distributing data to be stored over the array of disk storage drives of the RAID array and generating parity data for purposes of data recovery in the event of a loss of a disk storage drive of the array. In one embodiment, the parity data which is a form of metadata, is stored on each of the data storage media disks 16*a*, 16*b*, 16*c* of the disk storage drives 15*a*, 15*b*, 15*c*, respectively, with user data on each of the data storage media disks 16*a*, 16*b*, 16*c*. Alternatively, parity data may be separately stored in the metadata storage 14 of the RAID controller 354 with other metadata. Although the metadata storage 14 is depicted as a part of the RAID controller 354 in the embodiment of FIG. 8, it is appreciated that some or all of the metadata storage 14 may be distributed within the disk storage drives 15*a*, 15*b*, 15*c* such as being implemented as non-disk, non-volatile storage of the disk drive controllers 210*a*, 210*b*, 210*c* of the disk storage drives 15*a*, 15*b*, 15*c*, in a manner similar to that of the metadata storage 14 of the internal controller 210 of the disk storage drive 15 of the storage unit 12 of FIG. 4.

In one embodiment, the RAID controller 354 performs in addition to RAID functions, also performs functions related to power level management in accordance with the present description in a manner similar to that described above in connection with FIG. 4, for example. Thus, the RAID controller 354 may include, for example, power level mode logic configured to select and operate the RAID storage unit 350 in various power level modes including a low power level mode and a full power level as appropriate as a function of the whether storage locations being accessed reside in the metadata storage 14 or in the data storage media disks 16*a*, 16*b*, 16*c*, of the disk storage drives 15*a*, 15*b*, 15*c*, respectively.

Accordingly, in a manner similar to that described above in connection with the storage unit 12 of FIG. 4, in one embodiment of the RAID storage unit 350 of FIG. 8, input/output operations between the storage controller 4 (FIG. 2) and the metadata storage 14 may be performed in either the low power mode or the full power mode, depending upon the current power level mode of the storage unit 350. By comparison, input/output operations addressing logical locations of the data storage media disks 16*a*, 16*b*, 16*c* of the array of disk storage drives 15*a*, 15*b*, 15*c*, may be limited to being performed in the full power mode.

Thus, should the data storage unit 350 be currently in the low power mode and an input/output operation be received addressing the data storage media disks 16*a*, 16*b*, 16*c* of the array of disk storage drives 15*a*, 15*b*, 15*c*, power level mode logic of the RAID controller 354 changes the power level mode of the RAID storage unit 350 to the full power level mode prior to the data transfer logic of the RAID controller 354 initiating a read or write operation addressing logical locations of the data storage media disks 16*a*, 16*b*, 16*c* of the array of disk storage drives 15*a*, 15*b*, 15*c*, Conversely, should the RAID storage unit 350 be currently in the full power level mode and no read or write operation addressing logical locations of the data storage media disks 16*a*, 16*b*, 16*c* is conducted in a disk idle grace period initiated following the last read or write operation addressing logical locations of the data storage media disks 16*a*, 16*b*, 16*c*, power level mode logic of the RAID controller 354 changes the power level mode of the storage unit 304 back to the low power level mode until the next read or write operation addressing logical locations of the data storage media disks 16*a*, 16*b*, 16*c* is to be conducted.

It is seen from the above that power level management in a storage unit having both a disk storage drive and a metadata storage in accordance with the present description may reduce power consumption and extend the life of the storage unit. Other aspects and advantages may be realized, depending upon the particular application.

Figure 9:
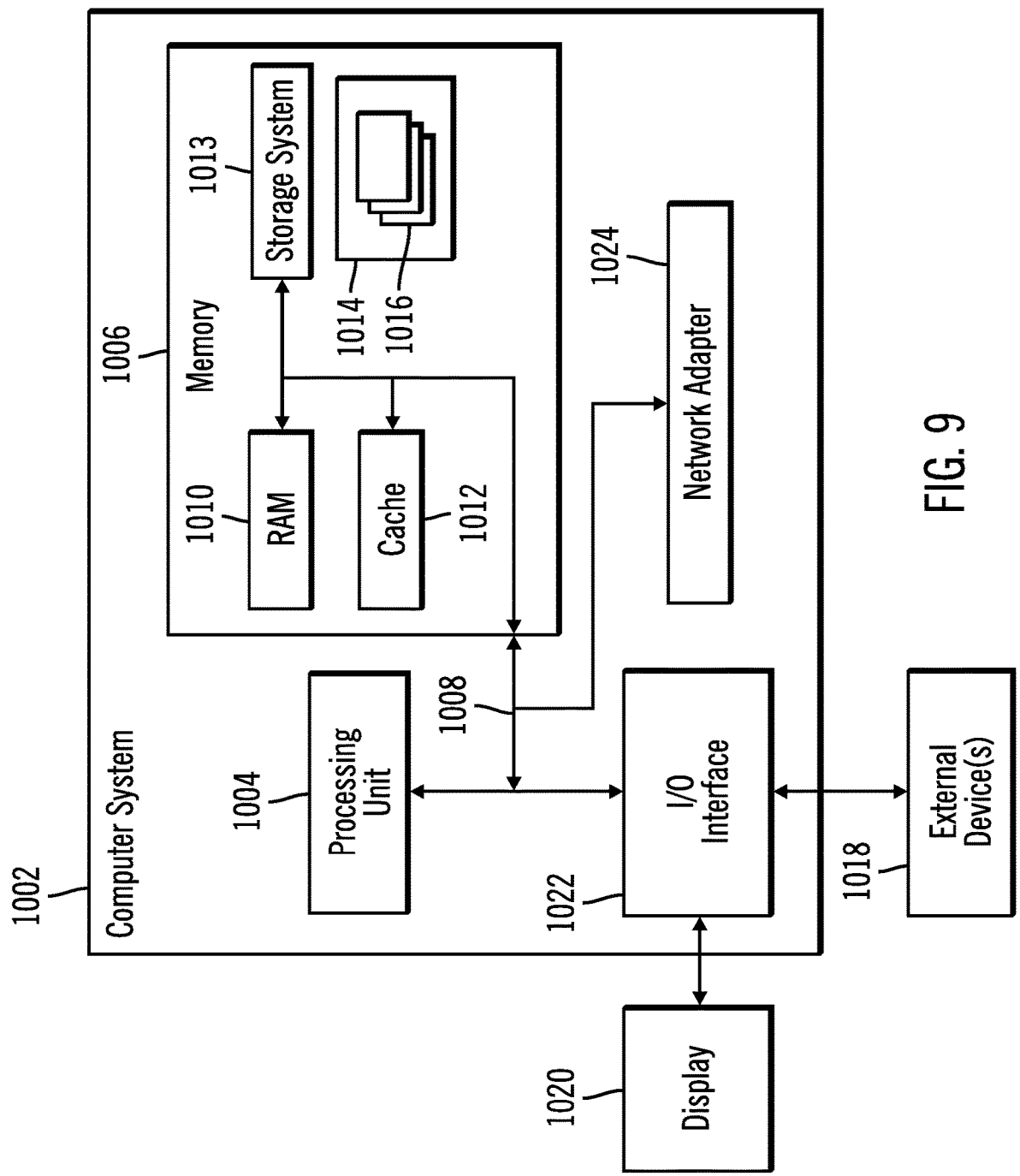
FIG. 9 illustrates a computer embodiment employing power level management in a data storage system in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system, comprising:
a data storage system having a storage controller and at least one storage unit controlled by the storage controller and configured to store data, wherein the storage controller has a processor and a cache, and wherein the storage unit has an input, a metadata storage configured to store metadata and a disk storage drive having a data storage media disk configured to store data; and
a computer program product comprising a computer readable storage medium having program instructions embodied therewith, the program instructions executable by a processor of the storage unit to cause storage unit processor operations, the storage unit processor operations comprising:
transferring metadata between a storage unit input and a metadata storage of the storage unit in a first power level mode in which reading data from and writing data to a data storage media disk of a disk storage drive of the storage unit is disabled;
receiving an input/output request to write data directed to a data storage location of the data storage media disk of the disk storage drive;
in response to the input/output request, changing a power level mode of the storage unit from the first power level mode to a second power level mode wherein the second power level mode has a higher level of power expenditure as compared to the first power level mode; and
transferring write data from the storage unit input to the data storage media disk of the disk storage drive in the second power level mode in which reading data from and writing data to the data storage media disk of the disk storage drive is enabled.

2. The system of claim 1 wherein the data storage media disk of the disk storage drive is configured to rotate at a first rate of rotation in the first power level mode and is configured to rotate at a second rate of rotation in the second power level mode wherein the first rate of rotation is less than the second rate of rotation of the data storage media disk and wherein the first rate of rotation is within a range which includes zero revolutions per minute.

3. The system of claim 2 wherein the storage unit processor operations further comprise:

receiving an input/output request directed to a data storage location of the data storage media disk of the disk storage drive in which the storage unit is in the first power level mode and reading data from and writing data to a data storage media disk of the disk storage drive is disabled; and in response to the input/output request, changing a power level mode of the storage unit from the first power level mode to the second power level mode, including increasing a rate of rotation of the data storage media disk from the first rate of rotation of the first power level mode to the second rate of rotation of the second power level mode, and executing the input/output request in the second power level mode following changing the power level mode of the storage unit from the first power level mode to the second power level mode wherein executing the input/output request in the second power level mode includes at least one of reading data from and writing data to the data storage media disk of the disk storage drive.

4. The system of claim 3 wherein the storage unit processor operations further comprise:

in response to changing the power level mode of the storage unit from the first power level mode to the second power level mode, timing a grace period of disk idle time;

determining whether at least one additional input/output request directed to a data storage location of the data storage media disk of the disk storage drive is received within the grace period of disk idle time; and upon expiration of the grace period of disk idle time, if it is determined that no additional input/output request directed to a storage location of the data storage media disk of the disk storage drive is received within the grace period of disk idle time, changing the power level mode of the storage unit from the second power level mode back to the first power level mode, including decreasing the rate of rotation of the data storage media disk from the second rate of rotation of the second power level mode back to the first rate of rotation of the first power level mode.

5. The system of claim 3 wherein the input/output request directed to a data storage location of the data storage media disk of the disk storage drive is directed to data which includes non-metadata.

6. The system of claim 2 wherein the storage unit processor operations further comprise:

receiving an input/output request directed to the metadata storage of the storage unit in which the storage unit is in the first power level mode and in which reading data from and writing data to a data storage media disk of the disk storage drive is disabled; and in response to the input/output request directed to the metadata storage, maintaining a power level mode of the storage unit at the first power level mode, including maintaining a rate of rotation of the data storage media disk at the first rate of rotation of the first power level mode of the storage unit, and executing the input/output request directed to the metadata storage in the first power level mode of the storage unit.

7. The system of claim 6 wherein the input/output request directed to the metadata storage of the storage unit is directed to data limited to metadata and wherein the metadata storage is one of non-volatile storage, non-volatile solid state memory, non-volatile flash memory and volatile memory having a backup battery power source.

8. The system of claim 1 wherein the computer program product further comprises a computer readable storage medium having program instructions embodied therewith and executable by a processor of the storage controller to cause storage controller processor operations, the storage controller processor operations comprising:

assigning first logical storage addresses of a logical storage address space to physical data storage locations of the metadata storage and assigning second logical storage addresses of the logical storage address space to physical data storage locations of the data storage media disk of the disk storage drive wherein the second logical storage addresses of the logical storage address space are separate from the first logical storage addresses of the logical storage address space.

9. The system of claim 1 further comprising receiving a metadata input/output request from one of a processor external to the storage unit and a processor internal to the storage unit wherein transferring metadata between the storage unit input and the metadata storage of the storage unit in the first power level mode is in response to a received metadata input/output request.

10. A computer program product for use with a storage unit having a processor wherein the computer program product comprises a computer readable storage medium having program instructions embodied therewith, the program instructions executable by a processor of the storage unit to cause processor operations, the storage unit processor operations comprising:

transferring metadata between a storage unit input and a metadata storage of the storage unit in a first power level mode in which reading data from and writing data to a data storage media disk of a disk storage drive of the storage unit is disabled;

receiving an input/output request to write data directed to a data storage location of the data storage media disk of the disk storage drive;

in response to the input/output request, changing a power level mode of the storage unit from the first power level mode to a second power level mode wherein the second power level mode has a higher level of power expenditure as compared to the first power level mode; and transferring write data from the storage unit input to the data storage media disk of the disk storage drive in the second power level mode in which reading data from and writing data to the data storage media disk of the disk storage drive is enabled.

11. The computer program product of claim 10 wherein the data storage media disk of the disk storage drive is configured to rotate at a first rate of rotation in the first power level mode and is configured to rotate at a second rate of rotation in the second power level mode wherein the first rate of rotation is less than the second rate of rotation of the data storage media disk and wherein the first rate of rotation is within a range which includes zero revolutions per minute.

12. The computer program product of claim 11 wherein the storage unit processor operations further comprise:

receiving an input/output request directed to a data storage location of the data storage media disk of the disk storage drive in which the storage unit is in the first power level mode and reading data from and writing data to a data storage media disk of the disk storage drive is disabled; and in response to the input/output request, changing a power level mode of the storage unit from the first power level mode to the second power level mode, including increasing a rate of rotation of the data storage media disk from the first rate of rotation of the first power level mode to the second rate of rotation of the second power level mode, and executing the input/output request in the second power level mode following changing the power level mode of the storage unit from the first power level mode to the second power level mode wherein executing the input/output request in the second power level mode includes at least one of reading data from and writing data to the data storage media disk of the disk storage drive.

13. The computer program product of claim 12 wherein the storage unit processor operations further comprise:
in response to changing the power level mode of the storage unit from the first power level mode to the second power level mode, timing a grace period of disk idle time;
determining whether at least one additional input/output request directed to a data storage location of the data storage media disk of the disk storage drive is received within the grace period of disk idle time; and
upon expiration of the grace period of disk idle time, if it is determined that no additional input/output request directed to a storage location of the data storage media disk of the disk storage drive is received within the grace period of disk idle time, changing the power level mode of the storage unit from the second power level mode back to the first power level mode, including decreasing the rate of rotation of the data storage media disk from the second rate of rotation of the second power level mode back to the first rate of rotation of the first power level mode.

14. The computer program product of claim 12 wherein the input/output request directed to a data storage location of the data storage media disk of the disk storage drive is directed to data which includes non-metadata.

15. The computer program product of claim 11 wherein the storage unit processor operations further comprise:
receiving an input/output request directed to the metadata storage of the storage unit in which the storage unit is in the first power level mode and in which reading data from and writing data to a data storage media disk of the disk storage drive is disabled; and
in response to the input/output request directed to the metadata storage, maintaining a power level mode of the storage unit at the first power level mode, including maintaining a rate of rotation of the data storage media disk at the first rate of rotation of the first power level mode of the storage unit, and executing the input/output request directed to the metadata storage in the first power level mode of the storage unit.

16. The computer program product of claim 15 wherein the input/output request directed to the metadata storage of the storage unit is directed to data limited to metadata and wherein the metadata storage is one of non-volatile storage, non-volatile solid state memory, non-volatile flash memory and volatile memory having a backup battery power source.

17. The computer program product of claim 10 further for use with a data storage system having a storage controller, wherein the storage unit is controlled by the storage controller wherein the storage controller has a processor and wherein the computer program product further comprises a computer readable storage medium having program instructions embodied therewith and executable by a processor of the storage controller to cause storage controller processor operations, the storage controller processor operations comprising:
assigning first logical storage addresses of a logical storage address space to physical data storage locations of the metadata storage and assigning second logical storage addresses of the logical storage address space to physical data storage locations of the data storage media disk of the disk storage drive wherein the second logical storage addresses of the logical storage address space are separate from the first logical storage addresses of the logical storage address space.

18. The computer program product of claim 10 further comprising receiving a metadata input/output request from one of a processor external to the storage unit and a processor internal to the storage unit wherein transferring metadata between the storage unit input and the metadata storage of the storage unit in the first power level mode is in response to a received metadata input/output request.

19. A method, comprising:
transferring metadata between a storage unit input and a metadata storage of a storage unit in a first power level mode in which reading data from and writing data to a data storage media disk of a disk storage drive of the storage unit is disabled;
receiving an input/output request to write data directed to a data storage location of the data storage media disk of the disk storage drive;
in response to the input/output request, changing a power level mode of the storage unit from the first power level mode to a second power level mode wherein the second power level mode has a higher level of power expenditure as compared to the first power level mode; and
transferring write data from the storage unit input to the data storage media disk of the disk storage drive in the second power level mode in which reading data from and writing data to the data storage media disk of the disk storage drive is enabled.

20. The method of claim 19 wherein the data storage media disk of the disk storage drive is configured to rotate at a first rate of rotation in the first power level mode and is configured to rotate at a second rate of rotation in the second power level mode wherein the first rate of rotation is less than the second rate of rotation of the data storage media disk and wherein the first rate of rotation is within a range which includes zero revolutions per minute.

21. The method of claim 20 further comprising:
receiving an input/output request directed to a data storage location of the data storage media disk of the disk storage drive in which the storage unit is in the first power level mode and reading data from and writing data to a data storage media disk of the disk storage drive is disabled; and
in response to the input/output request, changing a power level mode of the storage unit from the first power level mode to the second power level mode, including increasing a rate of rotation of the data storage media disk from the first rate of rotation of the first power level mode to the second rate of rotation of the second power level mode, and executing the input/output request in the second power level mode following changing the power level mode of the storage unit from the first power level mode to the second power level mode wherein executing the input/output request in the second power level mode includes at least one of reading data from and writing data to the data storage media disk of the disk storage drive.

22. The method of claim 21 further comprising:

in response to changing the power level mode of the storage unit from the first power level mode to the second power level mode, timing a grace period of disk idle time;

determining whether at least one additional input/output request directed to a data storage location of the data storage media disk of the disk storage drive is received within the grace period of disk idle time; and upon expiration of the grace period of disk idle time, if it is determined that no additional input/output request directed to a storage location of the data storage media disk of the disk storage drive is received within the grace period of disk idle time, changing the power level mode of the storage unit from the second power level mode back to the first power level mode, including decreasing the rate of rotation of the data storage media disk from the second rate of rotation of the second power level mode back to the first rate of rotation of the first power level mode.

23. The method of claim 21 wherein the input/output request directed to a data storage location of the data storage media disk of the disk storage drive is directed to data which includes non-metadata.

24. The method of claim 20 further comprising:

receiving an input/output request directed to the metadata storage of the storage unit in which the storage unit is in the first power level mode and in which reading data from and writing data to a data storage media disk of the disk storage drive is disabled; and in response to the input/output request directed to the metadata storage, maintaining a power level mode of the storage unit at the first power level mode, including maintaining a rate of rotation of the data storage media disk at the first rate of rotation of the first power level mode of the storage unit, and executing the input/output request directed to the metadata storage in the first power level mode of the storage unit.

25. The method of claim 24 wherein the input/output request directed to the metadata storage of the storage unit is directed to data limited to metadata and wherein the metadata storage is one of non-volatile solid state memory, non-volatile flash memory and volatile memory having a backup battery power source.

26. The method of claim 19 further comprising assigning first logical storage addresses of a logical storage address space to physical data storage locations of the metadata storage and assigning second logical storage addresses of the logical storage address space to physical data storage locations of the data storage media disk of the disk storage drive wherein the second logical storage addresses of the logical storage address space are separate from the first logical storage addresses of the logical storage address space.

27. The method of claim 19 further comprising receiving a metadata input/output request from one of a processor external to the storage unit and a processor internal to the storage unit wherein transferring metadata between the storage unit input and the metadata storage of the storage unit in the first power level mode is in response to a received metadata input/output request.

\* \* \* \* \*